Sept. 27, 1960
K. LEHOVEC ET AL
2,954,417
SOLID ELECTROLYTE BATTERY CELL
Filed Aug. 19, 1957
2 Sheets-Sheet 1
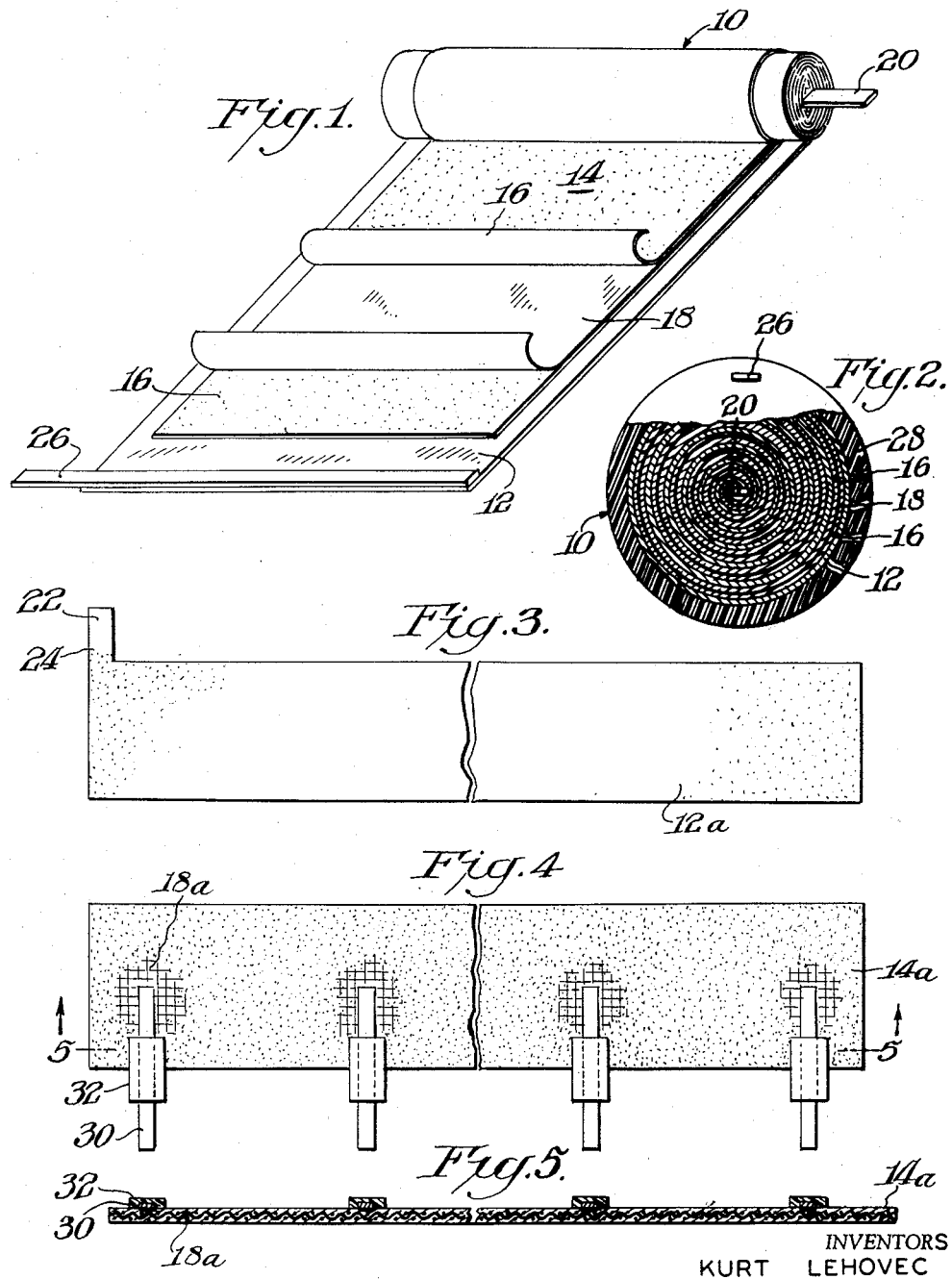
INVENTORS
KURT LEHOVEC
DONALD M. SMYTH
BY Connolly and Hutz
ATTORNEYS

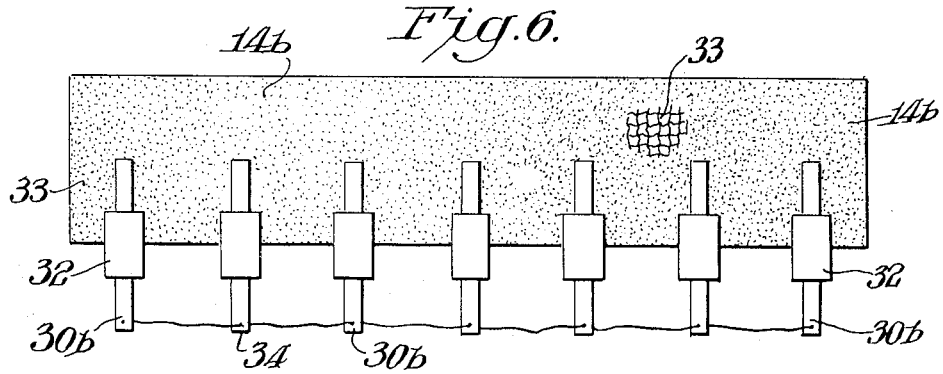
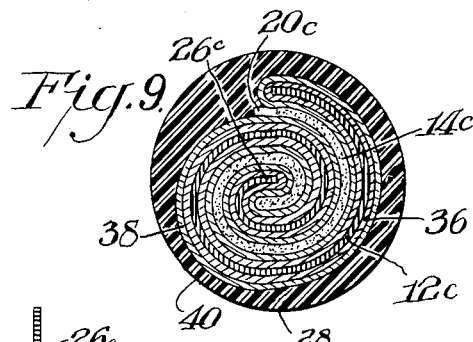
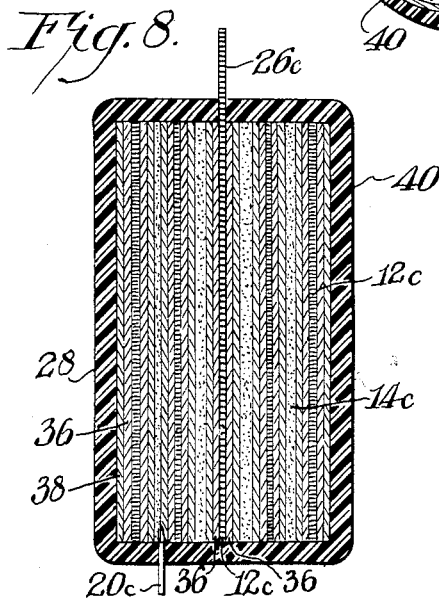
INVENTORS
KURT LEHOVEC
DONALD M. SMYTH

United States Patent Office 2,954,417
Patented Sept. 27, 1960

2,954,417
SOLID ELECTROLYTE BATTERY CELL

Kurt Lehovec and Donald M. Smyth, Williamstown, Mass., assignors to Sprague Electric Company, North Adams, Mass., a corporation of Massachusetts Filed Aug. 19, 1957, Ser. No. 678,776

2 Claims. (Cl. 136—13)

This invention relates to a solid electrolyte battery cell capable of providing relatively high current, and more particularly relates to a battery cell of the aforementioned type having constituent elements extended in area.

Up to the present, solid electrolyte battery cells have been provided for service which requires relatively low current, for example, in the range of a few microamperes and less. These relatively low current providing cells have been, for example, constructed in the form of flat discs or cups. Although, the flat disc and cup type battery cells might be adapted for providing relatively higher currents, for example in the milliampere, range, by merely increasing the area of the respective element, this is not practical because the resultant battery would have a bulky and inconvenient configuration.

An object of this invention is to provide a compact and convenient structure for a relatively high current solid electrolyte battery cell whose functional elements have a relatively extended area.

Another object is to provide a compact and relatively high current solid electrolyte battery cell that is simple and economical to manufacture.

In accordance with this invention, a compact structure for a solid electrolyte battery cell includes separate elongated rectangular sheets made of metallic electron donor anode material and non-metallic electron acceptor cathode material. The anode sheet is, for example, made slightly wider than the cathode and other sheets, and it is coated with a layer of solid electrolyte material. The sheet of cathode material is then disposed adjacent this coated anode sheet, and conductive material is placed in electrical contact with it. Then the various layers are rolled tightly together to form a cylindrical assembly. Terminal means in electrical contact with the anode and cathode sheets extend from the ends of the assembly. These terminals may be tabs of the anode and cathode sheets themselves, or they may be strips or rods placed in electrical contact therewith. The anode terminal and cathode terminals may conveniently extend from opposite sides of the cylindrical assembly. The entire assembly is then enclosed within insulating means through which the terminals extend. This insulating means may be provided by potting the cylindrical assembly in an insulating plastic, an epoxy resin for example.

The sheet of cathode material may be constructed by intimately pressing a mixture of electron acceptor material, for example a halogen, particularly iodine, and a suitable binder into a loose mesh of supporting material. This loose mesh may be for example a loose mesh of conductive wire, for example tantalum wire; or it may be a loosely woven non-conductive material for example paper. When paper is used, a conductive coil of tantalum, for example, may be placed in contact therewith for electrically connecting the cathode material to the terminal member; or thin strips of conductive material may be disposed at short intervals upon the sheet of cathode material. These strips may be externally joined in electrical contact for connection to the terminal. Sleeves of an insulating material may be placed over these strips where they cross the edge of the cathode material to effectively insulate these strips from the anode sheet.

Novel features and advantages of the present invention will bcome apparent to one skilled in the art from a reading of the following description in conjunction with the accompanying drawings wherein similar reference characters refer to similar parts and in which:

Fig. 1 is a perspective view of an embodiment of this invention in partially unassembled form;

Fig. 2 is a plan view partially in cross section of an assembled version of the embodiment shown in Fig. 1;

Fig. 3 is a plan view of an element of the embodiment shown in Fig. 1;

Fig. 4 is a plan view of an element of a modification of the embodiment shown in Fig. 1;

Fig. 5 is a cross-sectional view in elevation taken through Fig. 4 along the line 5—5 and looking in the direction of the arrows;

Fig. 6 is a plan view of an element of another modification of the embodiment shown in Fig. 1;

Fig. 7 is a cross-sectional view of an element of still another modification of the embodiment shown in Fig. 1;

Fig. 8 is a cross-sectional view in elevation of an embodiment of this invention incorporating the element shown in Fig. 7; and Fig. 9 is a cross-sectional view taken through Fig. 8 along the line 9—9 and looking in the direction of the arrows.

In Fig. 1 is shown a partially unassembled relatively high current solid electrolyte battery cell 10 formed of sheets of material rolled to form a cylindrical assembly. Sheet 12 is, for example, the widest sheet and is a sheet of metallic electron donor anode material, for example, silver approximately 5 mils in thickness. A sheet of non-metallic electron acceptor cathode material 14 is placed in electrical contact with anode sheet 12 by being placed in physical contact with it. Cathode sheet 14, as later more fully described in detail, for example, includes two sheets 16 made by intimately pressing, for example, a halogen substance, particularly iodine, into loosely woven sheets of an inert material, for example, paper. The halogen substance incorporates, for example, finely divided iodine combined with carbon black, and a suitable binder. The carbon black is, for example, a commercially obtainable product, for example, Vulcan S. C. brand of carbon black. The binder, carbon and iodine may be mixed in the following proportions: 10 parts by weight of the active material, iodine for example, are ground with two parts by weight of the high conductivity inert material such as carbon black. This grinding is accomplished, for example, in a glass ballmill. The ground mixture is then mixed, for example, with 12 parts by weight of a binder made, for example, of a polymonochlorotrifluoroethylene grease, for example, Kel–F No. 90 grease. This grease is composed of polymonochlorotrifluoroethylene oils and waxes thickened with an inert jelling agent as described in a bulletin entitled "Kel–F Fluorocarbon Oils, Waxes, Greases," copyright 1955, published by the M. W. Kellogg Co., Chemical Manufacturing Division, P.O. Box 469, Jersey City, New Jersey. The final mixture forms a putty-like dispersion of the active cathode material and carbon black in an unusually effective grease binder.

These two sheets of cathode material 16 are, for example, disposed on both sides of a metallic conductive foil 18 made, for example, of a thin sheet of tantalum ½ mil in thickness. The sheets of cathode material 16 are placed in electrical contact with the conductive foil 18 when the assembly is rolled. A cathode terminal means 20, for example, a conductive rod made of tantalum is electrically connected to tantalum foil 18 by spot welding for example.

Anode sheet 12, of silver for example, is preliminarily coated with a thin layer of electrolyte, for example, silver iodide (which is particularly advantageous when the cathode material is iodine) by reacting the silver foil 12 with iodine to completely cover it with a layer of silver iodide. The electrolyte thickness is dependent upon the time and temperature of the reaction and the iodine pressure utilized. For example, reacting a silver foil for six hours with iodine vapor at 60° C. and 4.3 millimeters of pressure gives a coating approximately of ½ mil of silver iodide solid electrolyte on the anode 12. A reacted anode sheet 12a is shown in Fig. 3 in which a tab 22 extends from a side of the sheet to provide a terminal means for the anode. A small portion of the silver iodide coating is removed as shown at 24 to provide effective electrical contact with the silver.

In Fig. 1, however, for example, the anode terminal means is provided by a silver rod 26 joined in electrical contact with the anode sheet, for example, by spot welding. As shown in Fig. 1, cathode terminal 20 extends from one side of rolled assembly within the center, for example, and the silver rod extends from the other side of the assembly.

An insulating enclosure is placed about the entire assembly, as shown in Fig. 2, by potting it in an epoxy resin 28, for example, which is relatively unaffected by the iodine vapors. A suitable potting epoxy resin is, for example, one of the compositions disclosed in U.S. Letters Patent No. 2,785,383. The extension of the anode and cathode terminals from opposite ends of the cylindrical assembly provides enough separation between them for the epoxy resin to effectively insulate the terminals from each other.

A battery cell of the type shown in Figs. 1 and 2 provides, for example, .68 volt and a short circuit current of 2.5 milliamperes per square centimeter of active cell area. When an electrolyte thickness of 1 mil of silver iodide is coated upon the anode sheet and an overall active area of 20 square centimeters of effective contact between the foils is utilized, 50 milliamperes of short circuit current may be drawn and 5 milliamperes may be drawn without an appreciable decrease in the cell voltage. However, after 1800 coulombs have been drawn from such a cell, that is 90 coulombs per square centimeter, the thickness of the silver iodide electrolyte layer is increased from 1 to 16 mils, and the short circuit current density decreases to .17 milliampere per square centimeter. Two cells of the aforementioned configuration may be used to provide 1.35 volts and 500 milliampere hours of coulombic capacity. A battery of this type is adequate for many hearing aid power supplies.

A battery of this type may be recharged to reduce the cost of replacement after the rated coulombic capacity is exceeded. In order to recharge this cell it is plugged into an external D.C. power source, such as a storage battery or a large dry cell in a manner which forces a current through the cell in the opposite direction to the direction of flow of the discharge current. This dissociates the silver iodide electrolyte layer into silver and free iodine. If convenient, an external battery charger including a rectifier and a transformer connected to an A.C. power line may be used for recharging. It may also be convenient to connect a solar battery to the solid electrolyte battery for recharging. This solar cell may be either built into the equipment including the solid electrolyte battery, or it may be an accessory which can be attached or removed at will. The solar cell or battery is connected in the opposite direction of current flow from the solid electrolyte battery to dissociate the electrolyte layer into silver and iodine when the solid electrolyte battery itself is not being used as a power source. Suitable control devices may be provided for alternately connecting the solid electrolyte battery to the load for discharge and to the solar battery for recharging.

In Figs. 4 and 5 is shown a modified cathode material sheet or foil 14a which is made, for example, of the aforementioned mixture of active cathode material, iodine for example, with carbon black and a suitable binder, such as Kel-F. No. 90 grease, intimately pressed into a fine mesh of conductive wire 18a tantalum wire for example. Electrical contact means 30 for this cathode sheet 14a includes, for example, a number of strips of tantalum foil ½ mil in thickness placed at short intervals upon the sheet 14a in electrical contact with the tantalum wire 18a. Strips 30, for example, are inserted through sleeves 32 of an insulating material, for example, Teflon, a tetrafluoroethylene polymer, which are placed across the junctions of the strips with the edge of sheet 14a. This effectively insulates these strips 30 from anode sheet 12. Teflon is particularly advantageous for this use because it is practically inert and an excellent insulating material.

In Fig. 6 is shown another form of cathode sheet 14b in which the aforementioned cathode material, for example, is rolled into intimate contact with loosely woven paper 33 in the same proportions referred to relative to the sheets 16 shown in Fig. 1. Electrical contact is made with the cathode material by placing strips of tantalum foil, for example ½ mil thickness, insulated in the same manner shown in Figs. 4 and 5 by Teflon sleeves 32b. In Fig. 6 are also shown bridging contact means 34, for example, tantalum leads 34, which bridge the tantalum strips 30b externally of sheet 14b to provide a means of electrically connecting the tantalum strips 30b to a terminal means.

In Figs. 7, 8 and 9 is shown still another modification of this invention in which the anode sheet 12c is coated with a layer of electrolyte material 36, silver iodide for example, in the manner previously described. This coated anode element is then covered with a conductive material, for example graphite, by, for example, painting it with a solution or dispersion of colloidal graphite in alcohol. This forms a conductive layer 38 entirely enclosing the coated anode strip 12c. A conductive terminal 20c a strip of or rod or tantalum, for example, is then placed in electrical contact with the graphite layer 38 at one end of the strip. Since a conductive dispersion is coated upon the anode strip 12c, the cathode strip 14c need only contain iodine and a binder. Strip 14c is, therefore, for example, an intimate combination of iodine and a suitable binder with a loosely woven mesh of paper for example. The sheet shown in cross section in Fig. 7 is tightly rolled together to form the cylindrical assembly shown in Figs. 8 and 9 with terminals 20c and 26c extending from opposite sides of the assembly. Terminal 26c is, for example, a tab of the type shown in Fig. 2 with the electrolyte removed. The cylindrical assembly is then potted, for example, in epoxy resin with the terminals 20c and 26c extending from opposite sides thereof. An effective insulating casing or enclosure 40 is thereby formed.

What is claimed is:

1. A structure for a solid electrolyte battery cell including metallic anode material and non-metallic cathode material, said structure comprising an elongated rectangular sheet of said anode material, said sheet of anode material being coated with a layer of solid electrolyte material, an elongated sheet of said cathode material being disposed adjacent said sheet of anode material, conductive material disposed in electrical contact with said cathode material, said sheets of anode and cathode material and said conductive material being rolled to form a cylindrical assembly, terminal means disposed in electrical contact with said anode and cathode sheets, insulating means disposed about the outside of said cylindrical assembly, said terminal means extending through said insulating means, said elongated sheet of said cathode material being comprised of a mixture of finely divided cathode material and a binder, said mixture being pressed into intimate contact with a loose mesh of supporting material, said loose mesh of supporting material being made of a loose mesh of conductive wire, thin strips of conductive material being disposed at short intervals upon said cathode material in electrical contact with said loose mesh of conductive wire, said strips being inserted through sleeves of an insulating material, said sleeves extending across the junction of said strips with the edge of said cathode sheet, and conductive means connects said strips externally of said sheet to a cathode terminal means.

2. A structure as set forth in claim 1 wherein said strips are comprised of tantalum, and said sleeves are comprised of Teflon.

References Cited in the file of this patent

UNITED STATES PATENTS

| | | |
|---|---|---|
| 2,310,932 | Brennan et al. | Feb. 16, 1943 |
| 2,562,215 | Ruben | July 31, 1951 |
| 2,610,220 | Brennan | Sept. 9, 1952 |
| 2,689,876 | Lehovec | Sept. 21, 1954 |
| 2,690,465 | Broder | Sept. 28, 1954 |
| 2,806,077 | Grupe et al. | Sept. 10, 1957 |